Patented July 7, 1942

2,289,316

UNITED STATES PATENT OFFICE 2,289,316

METALLIC SOAP SOLUTION

Robert J. Myers, Elkins Park, Pa., assignor to The Resinous Products & Chemical Company, Philadelphia, Pa.

No Drawing. Application November 16, 1939, Serial No. 304,700

8 Claims. (Cl. 106—243)

This invention relates to the preparation of solutions of metallic soaps in organic solvents. In particular it deals with relatively fluid preparations of the fatty acid soaps of polyvalent metals, particularly aluminum stearate, in organic solvents, which contain in addition to the fatty acid soap a metal salt of a hydrocarbon-substituted aryloxy aliphatic carboxylic acid.

For many applications of aluminum stearate, aluminum palmitate, aluminum oleate, or similar metallic soaps it is necessary first to make a solution of the metallic soap in an organic solvent. Many metallic soaps have the property of forming gels or of forming viscous solutions with such solvents, thus limiting the concentration of soap which may be handled in solvent, increasing the difficulties in using such soaps and often preventing utilization of the full benefits of these compounds. For example, where aluminum stearate is used in water-proofing fabric, wallboard, plaster, bricks, concrete, etc., by application of solutions or emulsions of solutions, concentrations have heretofore been unavoidably low and limited. This limitation has prevented utilization of the full degree of effectiveness of these compounds, apparently because it has not been possible to deposit a sufficiently coherent film on the treated surface and in the pores of the treated material. If it is attempted to make more concentrated solutions, gels are formed, which are handled with difficulty, and which prevent penetration of the metallic soap into porous material and proper application to the surface.

It has long been known that the addition of alkaline reagents usually offsets some part of the viscosity or plasticity which develops in gels of metallic soaps. In particular, certain organic bases are effective in this way since they tend to be more soluble in organic liquids or yield soaps which are organic solvent-soluble. The addition of such reagents, or soaps formed from these reagents, presents the very serious disadvantage that they or their soaps tend to be agents for wetting-out or wetting-back, and offset one of the most desirable properties of the metallic soaps, i. e., water-repellency. Even if very small quantities of these reagents are used, they decrease the water-resistance of the deposits of metallic soaps even though the apparent initial water-repellency of the surface remains favorable. When water-resistance is poor, waterproofness or damp-proofness is significantly lessened or even lost after exposure of a treated material to moisture or water.

It is an object of this invention to prepare solutions of metallic soaps, which are of increased utility. It is an object to overcome the gelling tendency of metallic soaps in organic solvents and to permit the preparation of organic solvent solutions of metallic soaps in high concentrations. It is also an object to decrease the viscosity or overcome plasticity of solutions of metallic soaps without causing a decrease in the effectiveness of these soaps in repelling and resisting moisture and water. It is a further object to provide a method for making organic solvent solutions of high concentrations of the polyvalent metal salts of fatty acids, particularly aluminum stearate.

Solutions of metallic soaps in organic solvents may be rendered less viscous and the gels normally formed may be rendered fluid by the presence in the solutions of an oil-soluble metal salt of a hydrocarbon-substituted aryl oxy-aliphatic carboxylic acid of the general formula

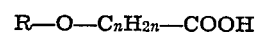

$$R\text{—}O\text{—}C_nH_{2n}\text{—}COOH$$

wherein $n$ represents a whole number less than six and R represents a hydrocarbon-substituted aryl group such as found in octylphenoxy-acetic acid or sec-amylnaphthyloxyacetic acid, etc. The substituents in the aryl group must possess a total of at least four carbon atoms and at least three of these carbon atoms must occur in the same substituent group. Thus, the isopropyl cresyl derivative is effective in imparting solubility, at least in some solvents such as the aromatic. The tertiary butylphenyl derivative is likewise effective, but the tetramethylphenyl derivative is not. Larger substituents in a phenyl or naphthyl nucleus, such as amyl, naphthenyl, hexyl, cyclohexyl, benzyl, phenyl, $\alpha,\alpha,\ \gamma,\gamma$-tetramethylbutyl, undecenyl, n-octyl, dodecyl, etc. are also effective both from the point of view of solubility and of action on the gels of metallic soaps. The substituents with various branched chains, such as are obtained from mixtures of the higher alcohols prepared in the methanol synthesis, are also of value and provide salts of mixed acids. Phenyl and naphthyl groups, carrying more than one hydrocarbon substituent, such as diamyl phenyl, octylcresyl, the above-mentioned isopropylmethyl phenyl, etc., also impart solubility in organic solvents to the oxyacids and provide highly useful members of the series. While there is no sharp upper limit as to the size of the hydrocarbon substituent of the aryl group, it will be obvious that as the size of this group increases, the ether acid will become more and more like the fatty acids and less effective in overcoming the gelling of solutions of metallic soaps. For this reason it is preferred to work with substituents having not more than twelve carbon atoms attached to the aryl nucleus.

The group represented by $-C_nH_{2n}-$ in the above formula is preferably $-CH_2-$ or $-CH_2.CH_2-$ as found in the oxyacetic or the oxypropionic acids, but it may also be such a group as $-CH(CH_3)CH_2-$, as in cyclohexylphenyloxyisobutyric acid, or a larger group as found in butylphenyloxyvaleric acids.

The oxyacids of the formula

vary from limpid oils to waxy solids, insoluble in water, and capable of forming oil-soluble salts with metals. Thus, there may be formed oil-soluble salts of polyvalent metals, such as magnesium, calcium, barium, aluminum, zinc, zirconium, etc., also salts of such elements as lead, cobalt, manganese, iron, tin, uranium, etc., which are known to be driers and hardeners for varnishes, resins, and the like. It is also possible to make salts of amines and of monovalent metals such as sodium and potassium. Such salts are also organic solvent-soluble, as well as being water-soluble, and are also effective in reducing the viscosity of gels or solutions of solvent-soluble metallic soaps. For purposes of reducing the viscosity of solvent solutions of metallic soaps, the above solvent-soluble metal salts may be mixed with the metallic soaps before solutions are prepared, or they may be added to the pure solvents or to already prepared solutions or gels of the metallic soaps. Also, a fatty acid and an aryloxycarboxylic acid may be simultaneously reacted or co-precipitated with a metal ion to give mixed or double salts.

The term "metallic soap" applies by general usage to the water-insoluble salts of the higher fatty acids and includes soaps prepared by fusion of fatty acids and oxide, hydroxide, etc., by precipitation from aqueous soap solutions or by metathesis in organic solvents. The fatty acids may be purified, essentially single entities or the usual mixtures found in commerce. The metal ion may be any one of the polyvalent ions, giving organic solvent-soluble soaps, the most common of which are magnesium, calcium, zinc, aluminum, lead, and iron. Mixtures of such soaps may also be used. As is well known, not every metallic soap is soluble in every organic solvent, but where solubility is obtained with formation of gels or viscous solutions, the effect of the aryl ether acids is to decrease viscosity.

The solvents in which metallic soaps may be taken up include aromatic hydrocarbons, such as benzene, toluene, xylene, etc., terpens, such as turpentine, solvent naphthas, hydrocarbon oils and essential oils, such as pine oil and the like, including such oils as oil of clove in which various soaps are soluble when warmed, chlorinated solvents, such as ethylene dichloride, in which moderate amounts of various metal soaps may be dissolved on warming, the higher esters, such as butyl acetate, amyl acetate, dibutyl sebacate, etc.

The solvent solutions and gels of the metallic soaps are sometimes considered as colloidal solutions or dispersions. For practical purposes, however, gel, colloidal solution, and solution are here embraced by the term "solution."

Typical solutions are shown in the following examples:

Example 1

One part of a commercial aluminum tristearate was dissolved in 24 parts by weight of toluene by warming below 100° C. The mixture became very viscous and set to a clear, colorless gel upon cooling to room temperature.

One part of aluminum tristearate, one-half part of aluminum caprylphenoxyacetate, and 23.5 parts of toluene were heated together below 100° C. A clear, slightly yellowish liquid was obtained, which remained fluid on cooling.

Example 2

A series of mixtures of aluminum stearate, various metal salts of caprylphenoxyacetic acid, and toluene were prepared by heating as above with the results summarized in the table below:

| Kind | Composition of solution | | | Solution | |
|---|---|---|---|---|---|
| | Oxyacetic acid salt | Stearate | Toluene | Solution | Stability |
| | Percent | Percent | Percent | | |
| None | | 4.0 | 96.0 | Clear gel | Good. |
| None | | 8.0 | 92.0 | Clear, stiff gel | Do. |
| Zn | 2.6 | 8.0 | 89.4 | Slightly turbid liquid | Thickens. |
| Zn | 1.8 | 4.0 | 94.2 | do | Good. |
| Ca | 2.0 | 4.0 | 94.0 | Clear liquid | Slight precipitation. |
| Ca | 4.0 | 4.0 | 92.0 | do | Do. |
| Ca | 8.0 | 4.0 | 88.0 | do | Do. |
| Na | 2.0 | 4.0 | 94.0 | Clear, yellowish liquid | Good. |
| Na | 4.0 | 4.0 | 92.0 | do | Do. |
| Na | 8.0 | 4.0 | 88.0 | do | Do. |
| Co | 2.0 | 4.0 | 94.0 | Clear, red-violet liquid | Do. |
| Co | 8.0 | 4.0 | 88.0 | do | Do. |
| Pb | 2.0 | 4.0 | 94.0 | Clear when warm | Precipitation cold. |
| Pb | 8.0 | 4.0 | 88.0 | do | Do. |
| Al | 2.0 | 4.0 | 94.0 | Clear liquid | Good. |
| Al | 4.0 | 4.0 | 94.0 | do | Do. |
| Al | 8.0 | 4.0 | 92.0 | do | Do. |
| Mg | 2.0 | 4.0 | 94.0 | do | Do. |
| Mg | 8.0 | 4.0 | 88.0 | do | Do. |
| Zn | 4.0 | 4.0 | 92.0 | do | Do. |
| Zn | 8.0 | 4.0 | 88.0 | do | Slight precipitation. |
| Acid | 4.0 | 4.0 | 92.0 | do | Good. |

In the case of solutions which yielded slight precipitates on standing, it was found that the precipitates redissolved when the solutions were warmed, but even in these cases the gels were broken.

Example 3

Mixtures of aluminum stearate and aluminum caprylphenoxyacetate were prepared by fusion. Mixtures containing one part of aluminum stearate and 0.5, 1.0, and 2.0 parts of aluminum caprylphenoxyacetate respectively were heated to 140–150° C. When the fused samples had cooled to less than 100° C., they were taken up in toluene. In every case a limpid solution resulted. The following table summarizes results and compositions:

| Preparation | a | b | c | d |
|---|---|---|---|---|
| Parts of aluminum stearate | 1.0 | 1.0 | 1.0 | 1.0 |
| Parts of aluminum ether acid salt | 0.0 | 0.5 | 1.0 | 2.0 |
| Parts of toluene | 24.0 | 23.5 | 23.0 | 22.0 |
| Condition | Gelled | Liquid | Liquid | Liquid |

Example 4

A mixture of 4 parts of aluminum $\alpha,\alpha,\gamma,\gamma$-tetramethylbutyl phenoxyacetate, 8 parts of aluminum stearate, and 88 parts of toluene was heated until a clear solution was obtained. No gel resulted on cooling and standing. Similar solutions were made in which the aluminum salt of $\alpha,\alpha,\gamma,\gamma$-tetramethylbutylphenoxyacetic acid was replaced first by the magnesium salt and then by the manganese salt. In both cases the solutions remained stable and free from gelation.

In the case of aluminum stearate, it is possible to prepare viscous, but fluid, solutions containing 10% aluminum stearate with 2% or more of a salt of a substituted aryl ether acid. The quantity of a salt of the ether acid required to overcome the gelling action of metallic soaps will depend upon the particular salt, the soap, and the solvent used. In general one part of a salt of an aryl ether acid to about five or fewer parts of a metallic soap will overcome the gelling tendencies of the soap in a solvent therefor or render such soap solutions less viscous. This permits the use of higher concentrations of metallic soaps and when such solutions are used directly, as in water-proofing, it enables the deposition of more continuous, coherent films, not only because of the higher concentrations now possible, but also because of improved flow and penetration. The nature of the film will, of course, depend upon the particular materials used and their relative proportions. Films of high water-repellency and excellent water-resistance are readily obtained by this procedure. The solutions of metallic soaps and ether carboxylic acids may be used for moisture-proofing and waterproofing many types of smooth, fibrous, and porous materials, such as fabrics of all sorts, wearing apparel, masonry, wood, concrete, fiber board, etc. In dry-cleaning some of the solution of metallic soaps may be added to the bath to supply some detergent action, to permit the addition of small amounts of moisture, to cut down the hazard from static, and to help impart desirable finish and hand to clothes. The solutions of this invention may be added to lacquers, paints and varnishes to increase the water-resistance of the films formed therefrom, to give flatting or matte effects, to improve the dispersion of various pigments in oil paints, and enamels, etc. Such actions may be obtained without the false body which results from the use of the metal soaps alone.

I claim:

1. A non-gelatinous solution comprising an organic solvent-soluble, water-insoluble, metallic soap, said soap being present in an amount normally yielding solutions of objectionable viscosity, an organic solvent-soluble metal salt of an acid having the formula

wherein $n$ represents a whole number less than 6 and R represents an aryl group which is selected from a member of the class consisting of phenyl and naphthyl nuclei and which is hydrocarbon-substituted with at least four carbon atoms, at least three of which atoms are in a single substituent group, and a liquid water-immiscible organic solvent for said metallic soap and said metal salt.

2. A non-gelatinous solution comprising a polyvalent metal soap of stearic acid in an amount which would normally produce a highly viscous solution, a polyvalent metal salt of an acid having the formula

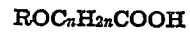

wherein $n$ represents a whole number less than 6 and R represents an aryl group which is selected from a member of the class consisting of phenyl and naphthyl nuclei and which is hydrocarbon-substituted with at least four carbon atoms, at least three of which atoms are in a single substituent group, and a liquid water-immiscible organic solvent for said metallic soap and said metal salt.

3. A non-gelatinous solution comprising an aluminum salt of a higher fatty acid, said soap being present in an amount normally yielding solutions of objectionable viscosity, a polyvalent metal salt of an acid having the formula

wherein $n$ represents a whole number less than 6 and R represents an aryl group which is selected from a member of the class consisting of phenyl and naphthyl nuclei and which is hydrocarbon-substituted with at least four carbon atoms, at least three of which atoms are in a single substituent group, and a liquid water-immiscible organic solvent for said metallic soap and said metal salt.

4. A non-gelatinous solution comprising aluminum stearate in an amount normally producing highly viscous solutions, aluminum caprylphenoxyacetate and a liquid, water-immiscible organic solvent for said stearate and caprylphenoxyacetate.

5. In the process of making a solution of water-insoluble metallic soap in a liquid, water-immiscible organic solvent, the improvement which comprises decreasing the viscosity of said solution by incorporating therein an organic solvent-soluble salt of an acid having the formula

wherein $n$ represents a whole number less than 6 and R represents an aryl group which is selected from a member of the class consisting of phenyl and naphthyl nuclei and which is hydrocarbon-substituted with at least four carbon atoms, at least three of which atoms are in a single substituent group.

6. In the process of making a solution of an aluminum soap of a higher fatty acid in a liquid, water-immiscible organic solvent, the improvement which comprises decreasing the viscosity of said solution by incorporating therein an aluminum salt of an acid having the formula

wherein $n$ represents a whole number less than 6 and R represents an aryl group which is selected from a member of the class consisting of phenyl and naphtyl nuclei and which is hydrocarbon-substituted with at least four carbon atoms, at least three of which atoms are in a single substituent group.

7. In the process of making a solution of an aluminum soap of a higher fatty acid in a liquid water-immiscible organic solvent, the improvement which comprises decreasing the viscosity of said solution by having aluminum caprylphenoxyacetate dissolved therein.

8. The improvement of claim 7 in which the aluminum soap is aluminum stearate.

ROBERT J. MYERS.